(12) United States Patent
Kang et al.

(10) Patent No.: US 11,997,309 B2
(45) Date of Patent: May 28, 2024

(54) METHOD AND APPARATUS FOR ENCODING AND DECODING VIDEO USING INTER-PREDICTION

(71) Applicants: Hyundai Motor Company, Seoul (KR); Kia Corporation, Seoul (KR); Ewha University—Industry Collaboration Foundation, Seoul (KR)

(72) Inventors: Je Won Kang, Seoul (KR); Seung Wook Park, Yongin (KR); Wha Pyeong Lim, Hwaseong (KR)

(73) Assignees: Hyundai Motor Company, Seoul (KR); Kia Corporation, Seoul (KR); Ewha University-Industry Collaboration Foundation, Seoul (KR)

( * ) Notice: Subject to any disclaimer, the term of this patent is extended or adjusted under 35 U.S.C. 154(b) by 0 days.

(21) Appl. No.: 17/868,972

(22) Filed: Jul. 20, 2022

(65) Prior Publication Data
US 2022/0368936 A1    Nov. 17, 2022

Related U.S. Application Data

(63) Continuation of application No. 17/263,597, filed as application No. PCT/KR2020/008917 on Jul. 8, 2020, now Pat. No. 11,432,002.

(30) Foreign Application Priority Data

Jul. 8, 2019 (KR) .......................... 10-2019-0081925
Jul. 8, 2020 (KR) .......................... 10-2020-0083980

(51) Int. Cl.
*H04N 19/52* (2014.01)
*H04N 19/132* (2014.01)
(Continued)

(52) U.S. Cl.
CPC ........... *H04N 19/52* (2014.11); *H04N 19/132* (2014.11); *H04N 19/176* (2014.11); *H04N 19/70* (2014.11)

(58) Field of Classification Search
CPC ....... H04N 19/52; H04N 19/513; H04N 19/70
See application file for complete search history.

(56) References Cited

U.S. PATENT DOCUMENTS

| | | |
|---|---|---|
| 8,665,958 B2 | 3/2014 | Kim et al. |
| 10,404,993 B2 | 9/2019 | Chen et al. |
| (Continued) | | |

FOREIGN PATENT DOCUMENTS

| | | |
|---|---|---|
| KR | 10-2009-0083290 A | 8/2009 |
| KR | 10-2017-0125086 A | 11/2017 |
| KR | 10-2019-0033635 A | 3/2019 |

*Primary Examiner* — Neil R Mikeska
(74) *Attorney, Agent, or Firm* — Fox Rothschild LLP

(57) ABSTRACT

A video decoding apparatus is provided for decoding pictures using inter-prediction. The video decoding apparatus includes a predictor that generates affine prediction samples for respective subblocks in a target block in a current picture to be decoded by performing affine motion prediction on a subblock-by-subblock basis using control point motion vectors which respectively correspond to corners of the target block. The predictor also modifies sample values of the affine prediction samples by executing a first coding tool, the first coding tool compensating for motion according to sample positions in each of the subblocks using the control point motion vectors.

11 Claims, 11 Drawing Sheets

(51) Int. Cl.
*H04N 19/176* (2014.01)
*H04N 19/70* (2014.01)

(56) References Cited

U.S. PATENT DOCUMENTS

| | | |
|---|---|---|
| 10,659,802 B2 | 5/2020 | Lainema |
| 2006/0039476 A1* | 2/2006 | Watanabe ............ H04N 19/132 |
| | | 375/240.24 |
| 2007/0076796 A1* | 4/2007 | Shi ........................ H04N 19/51 |
| | | 375/240.26 |
| 2021/0281849 A1* | 9/2021 | Kondo ................. H04N 19/124 |

* cited by examiner

METHOD AND APPARATUS FOR ENCODING AND DECODING VIDEO USING INTER-PREDICTION

CROSS-REFERENCE TO RELATED APPLICATION

This application is a Continuation of application Ser. No. 17/263,597 filed on Jan. 27, 2021, which is a 35 U.S.C. § 371 of International Application No. PCT/KR2020/008917, filed Jul. 8, 2020, which claims priority to Patent Application No. 10-2019-0081925, filed on Jul. 8, 2019 in Korea, and Patent Application No. 10-2020-0083980, filed on Jul. 8, 2020 in Korea, the entire contents of which are incorporated herein by reference.

TECHNICAL FIELD

The present disclosure relates to encoding and decoding of a video, and more particularly, to a coding tool for improving the compression performance of inter-prediction.

BACKGROUND ART

Since the volume of video data is greater than that of voice data or still image data, storing or transmitting video data without processing for compression requires a lot of hardware resources including memory. Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the picture size, resolution, and frame rate are gradually increasing, and accordingly the amount of data to be encoded is also increasing. Accordingly, a new compression technique having better encoding efficiency and higher image quality than the existing compression technique is required.

In video encoding, predictive encoding is mainly used to improve compression performance. There are intra-prediction for predicting a target block to be encoded based on pre-reconstructed samples in a current picture, and inter-prediction for predicting a current block using a pre-reconstructed reference picture. In particular, the inter-prediction is widely used for video encoding because it exhibits superior compression performance compared to intra-prediction. The present disclosure proposes a coding tool for improving the compression performance of the existing inter-prediction.

SUMMARY

In particular, the present disclosure relates to a coding tool for improving the compression performance of inter-prediction, and in one aspect, relates to a coding tool capable of compensating for various motions of an object including translation motion.

In accordance with one aspect of the present disclosure, provided is a video decoding apparatus for decoding pictures using inter-prediction. The apparatus includes a predictor configured to generate affine prediction samples for respective subblocks in a target block in a current picture to be decoded by performing affine motion prediction on a subblock-by-subblock basis using control point motion vectors which respectively correspond to corners of the target block, and modify sample values of the affine prediction samples by executing a first coding tool, the first coding tool compensating for motion according to sample positions in each of the subblocks using the control point motion vectors. The predictor determines whether to execute the first coding tool based on at least one of values of the control point motion vectors or an angle between the control point motion vectors.

In accordance with another aspect of the present disclosure, provided is a video encoding apparatus for encoding pictures using inter-prediction. The apparatus includes a predictor configured to determine control point motion vectors which respectively correspond to corners of a target block split from a current picture to be encoded and generate affine prediction samples for respective subblocks in the target block by performing affine motion prediction on a subblock-by-subblock basis using the control point motion vectors, and modify sample values of the affine prediction samples by executing a first coding tool, the first coding tool compensating for motion according to sample positions in each of the subblocks using the control point motion vectors. The predictor determines whether to execute the first coding tool based on at least one of values of the control point motion vectors or an angle between the control point motion vectors.

In accordance with another aspect of the present disclosure, provided is a video decoding method using inter-prediction. The method includes generating affine prediction samples for respective subblocks in a target block to be decoded by performing affine motion prediction on a subblock-by-subblock basis using control point motion vectors which respectively correspond to corners of the target block, determining whether to execute a first coding tool based on at least one of values of the control point motion vectors or an angle between the control point motion vectors, and in response to determining that the first coding tool is executed, modifying sample values of the affine prediction samples by compensating for motion according to sample positions in each of the subblocks using the control point motion vectors.

DETAILED DESCRIPTION

Figure 1:
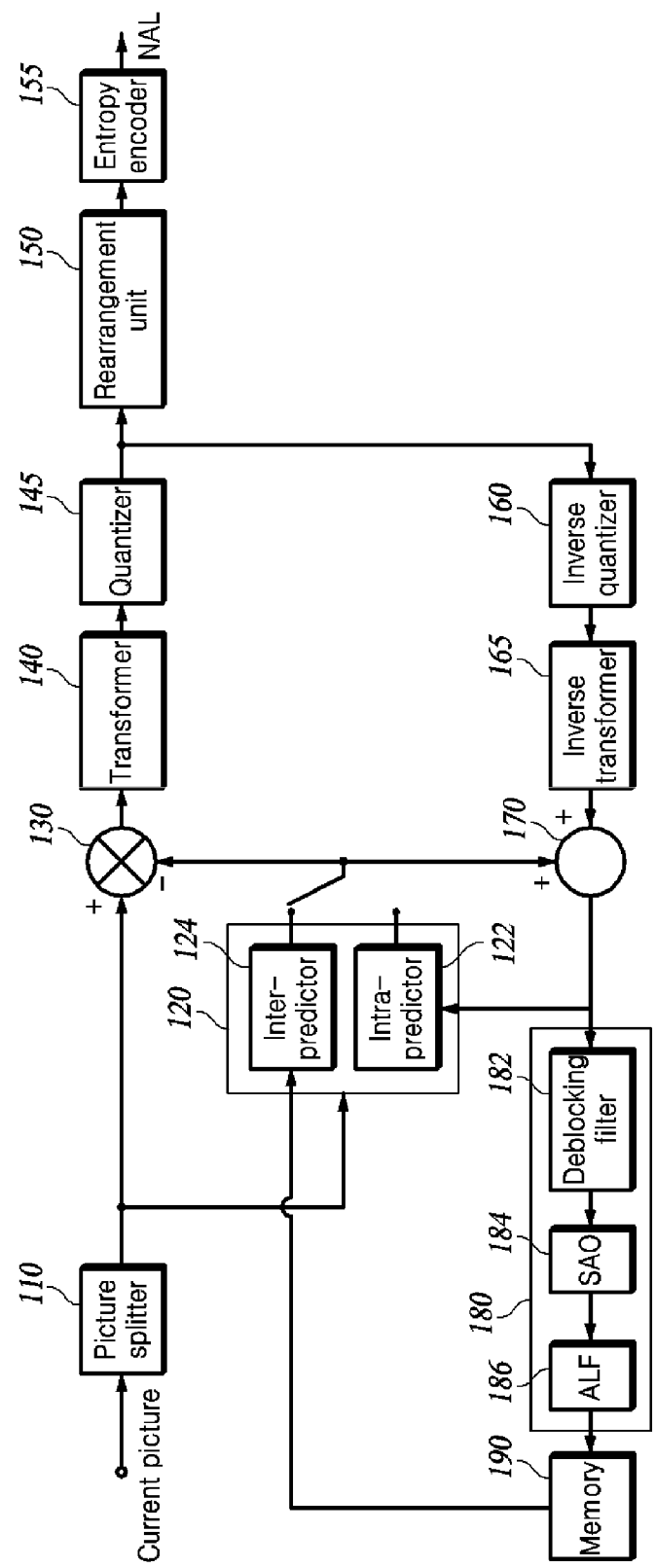
FIG. 1 is an exemplary block diagram of a video encoding apparatus capable of implementing the techniques of the present disclosure.

Hereinafter, some exemplary embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a block splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190. Each element of the video encoding apparatus may be implemented in hardware or software, or a combination of hardware and software. The functions of the respective elements may be implemented as software, and a microprocessor may be implemented to execute the software functions corresponding to the respective elements.

One video is composed of one or more sequences including a plurality of pictures. Each picture is split into a plurality of regions, and encoding is performed on each region. For example, one picture is split into one or more tiles or/and slices. In particular, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU.

In addition, information applied to all blocks in one slice in common is encoded as a syntax of a slice header, and information applied to all blocks constituting one or more pictures is encoded in a picture parameter set (PPS) or a picture header. Furthermore, information which a sequence composed of a plurality of pictures refers to in common is encoded in a sequence parameter set (SPS). In addition, information applied to one tile or tile group in common may be encoded as a syntax of a tile or tile group header. The syntaxes included in the SPS, PPS, slice header, and tile or tile group header may be referred to as high-level syntaxes.

The block splitter 110 may be configured to determine the size of a coding tree unit (CTU). Information about the size of the CTU (CTU size) is encoded as a syntax of the SPS or PPS and is transmitted to the video decoding apparatus. The block splitter 110 may be configured to split each picture constituting the video into a plurality of CTUs having a predetermined size, and then recursively split the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. Particularly, BTTT may be collectively referred to as a multiple-type tree (MTT).

Figure 2:
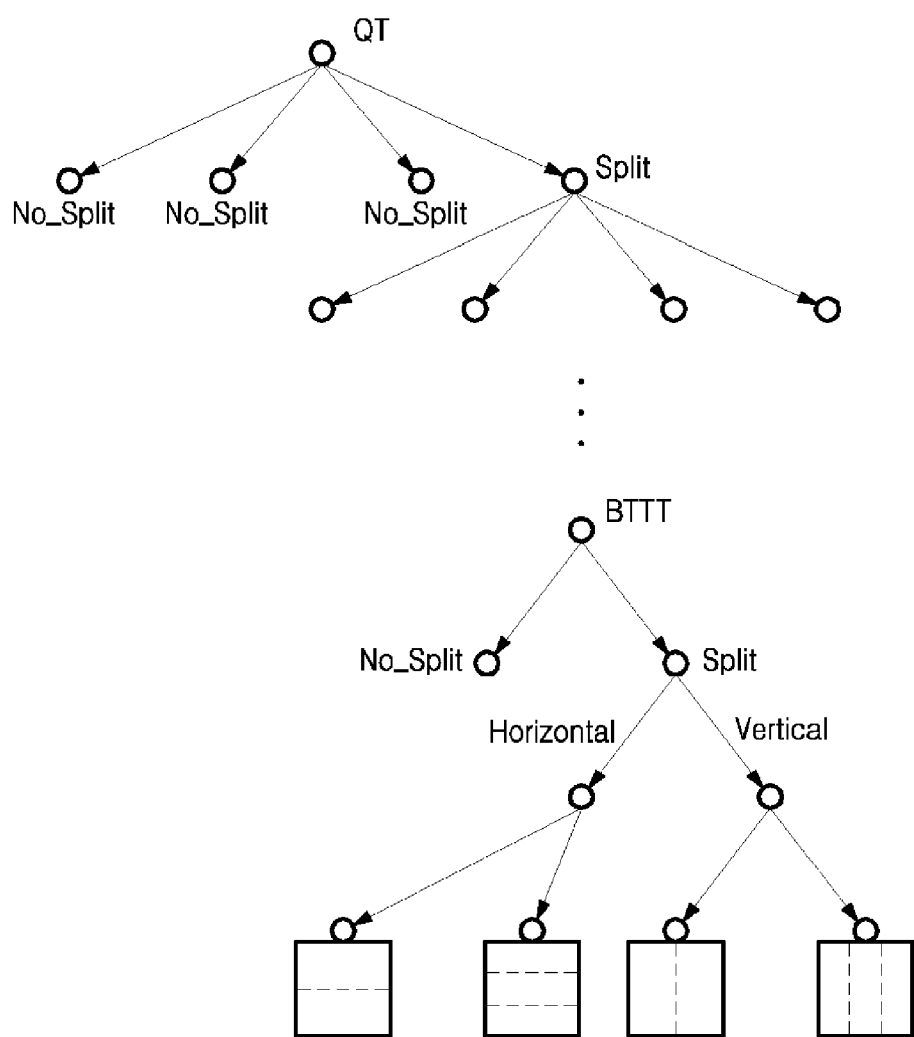
FIG. 2 exemplarily shows block partitioning structure using a QTBTTT structure.

FIG. 2 exemplarily shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is less than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split.

As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) may be encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus may be configured to start encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type may be encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

In particular, CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular. The predictor 120 may be configured to predict the current block to generate a prediction block. The predictor 120 includes an intra-predictor 122 and an inter-predictor 124.

Figure 3:
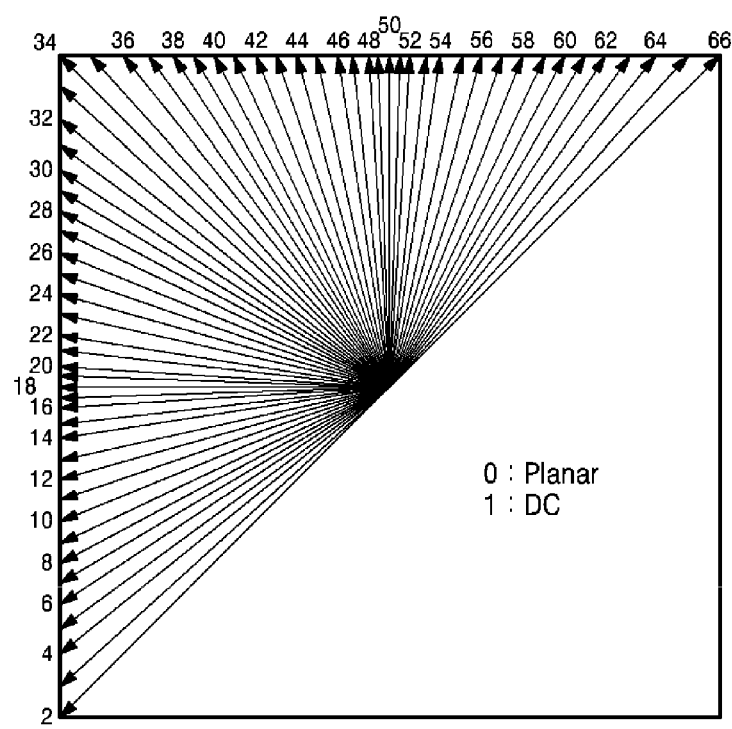
FIG. 3 exemplarily shows a plurality of intra-prediction modes.

The intra-prediction unit 122 may be configured to predict samples in the current block using samples (reference samples) positioned around the current block in the current picture including the current block. There is a plurality of intra-prediction modes according to the prediction directions. For example, as shown in FIG. 3, the plurality of intra-prediction modes may include two non-directional modes, which include a planar mode and a DC mode, and 65 directional modes. Neighboring samples and an equation to be used are defined differently for each prediction mode.

The intra-predictor 122 may be configured to determine an intra-prediction mode to be used in encoding the current block. In some examples, the intra-predictor 122 may be configured to encode the current block using several intra-prediction modes and select an appropriate intra-prediction mode to use from the tested modes. For example, the intra-predictor 122 may be configured to calculate rate distortion values using rate-distortion analysis of several tested intra-prediction modes, and select an intra-prediction mode that has the best rate distortion characteristics among the tested modes. The intra-predictor 122 may be configured to select one intra-prediction mode from among the plurality of intra-prediction modes, and predict the current block using neighboring pixels (reference pixel) and an equation determined according to the selected intra-prediction mode. Information about the selected intra-prediction mode may be encoded by the entropy encoder 155 and transmitted to the video decoding apparatus.

The inter-predictor 124 may be configured to generate a prediction block for the current block through a motion compensation. Additionally, the inter-predictor 124 may be configured to search for a block most similar to the current block in a reference picture which has been encoded and decoded earlier than the current picture, and generate a prediction block for the current block using the searched block. Then, the inter-predictor may be configured to generate a motion vector corresponding to a displacement between the current block in the current picture and the prediction block in the reference picture. In general, motion estimation may be performed on a luma component, and a motion vector calculated based on the luma component may be used for both the luma component and the chroma component. The motion information including information about the reference picture and information about the motion vector used to predict the current block may be encoded by the entropy encoder 155 and transmitted to the video decoding apparatus.

The inter-predictor 124 may be configured to perform interpolation on a reference picture or a reference block to increase prediction accuracy. In other words, subsamples between two consecutive integer samples may be interpolated by applying filter coefficients to a plurality of consecutive integer samples including the two integer samples. When the operation of searching for a block most similar to the current block is performed on the interpolated reference picture, the motion vector may be expressed at a precision level of fractional sample unit, not a precision level of integer sample unit. The precision or resolution of the motion vector may be set differently for each target region to be encoded, for example, each unit such as a slice, tile, CTU, or CU. When such an adaptive motion vector resolution is applied, information about motion vector resolution to be applied to each target region should be signaled for each target region. For example, when the target region is a CU, information about the motion vector resolution applied to each CU is signaled. The information about the motion vector resolution may be information indicating the precision of a motion vector difference which will be described later.

The inter-predictor 124 may be configured to perform inter-prediction using bi-prediction. In bi-directional prediction, the inter-predictor 124 uses two reference pictures and two motion vectors representing block positions most similar to the current block in the respective reference pictures. The inter-predictor 124 may be configured to select a first reference picture and a second reference picture from reference picture list 0 (RefPicList0) and reference picture list 1 (RefPicList1), respectively, search for blocks similar to the current block in the respective reference pictures, and generate a first reference block and a second reference block. Then, the inter-predictor 124 may be configured to generate a prediction block for the current block by averaging or weighting the first reference block and the second reference block.

Then, the inter-predictor 124 may be configured to transfer motion information including information about the two reference pictures and the two motion vectors used to predict the current block to the encoder 150. In particular, RefPicList0 may be composed of pictures preceding the current picture in display order among the reconstructed pictures, and RefPicList1 may be composed of pictures following the current picture in display order among the reconstructed pictures. However, exemplary embodiments are not limited thereto. Pre-reconstructed pictures following the current picture in display order may be further included in RefPicList0, and conversely, and pre-reconstructed pictures preceding the current picture may be further included in RefPicList1.

Various methods may be used to minimize the number of bits required to encode the motion information. For example, when the reference picture and motion vector of the current block are the same as the reference picture and motion vector of a neighboring block, the motion information about the current block may be transmitted to the decoding apparatus by encoding information for identifying the neighboring block. This method is called a "merge mode." In the merge mode, the inter-predictor 124 may be configured to select a predetermined number of merge candidate blocks (hereinafter referred to as "merge candidates") from among the neighboring blocks of the current block.

Figure 4:
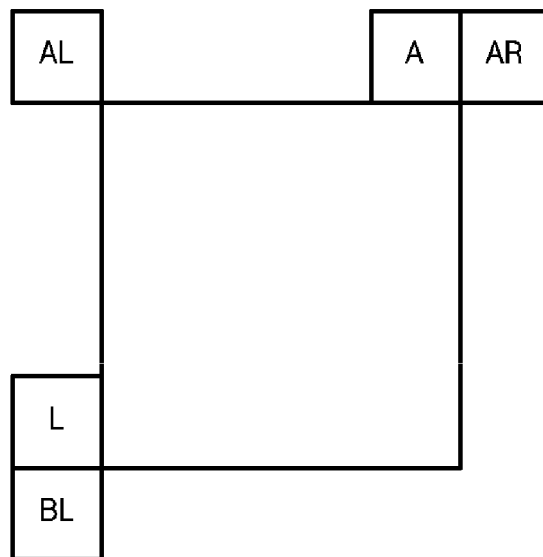
FIG. 4 exemplarily shows neighboring blocks around a current block.

As illustrated in FIG. 4, all or part of a left block L, an above block A, an above right block AR, a bottom left block BL, and an above left block AL, which are adjacent to the current block in the current picture, may be used as neighboring blocks for deriving merge candidates. In addition, a block located within a reference picture (which may be the same as or different from the reference picture used to predict the current block) other than the current picture in which the current block is located may be used as a merge candidate. For example, a co-located block which is at the same position as the current block or blocks adjacent to the co-located block in the reference picture may be additionally used as merge candidates.

The inter-predictor 124 configures a merge list including a predetermined number of merge candidates using such neighboring blocks. The inter-predictor 124 may be configured to select a merge candidate to be used as the motion information about the current block from among the merge candidates included in the merge list, and generate merge index information for identifying the selected candidates. The generated merge index information is encoded by the encoder 155 and transmitted to the decoding apparatus.

Another method of encoding the motion information is an AMVP mode. In the AMVP mode, the inter-predictor 124 derives predicted motion vector candidates for the motion vector of the current block by using neighboring blocks of the current block. All or part of the left block L, the above block A, the above right block AR, the bottom left block BL, and the above left block AL, which are adjacent to the current block in the current picture in FIG. 2, may be used as the neighboring blocks used to derive the predicted motion vector candidates. In addition, a block positioned within a reference picture (which may be the same as or different from the reference picture used to predict the current block) other than the current picture including the current block may be used as the neighboring blocks used to derive the predicted motion vector candidates. For example, a co-located block which is at the same position as the current block or blocks adjacent to the co-located block in the reference picture may be used.

The inter-predictor 124 may be configured to derive predicted motion vector candidates using the motion vectors of the neighboring blocks, and determine a predicted motion vector for the motion vector of the current block using the predicted motion vector candidates. Then, a motion vector difference may be calculated by subtracting the predicted motion vector from the motion vector of the current block.

The predicted motion vector may be obtained by applying a predefined function (e.g., a function for calculating a median, an average, or the like) to the predicted motion vector candidates. In particular, the video decoding apparatus also knows the predefined function. Since the neighboring blocks used to derive the predicted motion vector candidates have already been encoded and decoded, the video decoding apparatus already knows the motion vectors of the neighboring blocks as well. Accordingly, the video encoding apparatus does not need to encode information for identifying the predicted motion vector candidates. Therefore, in this case, the information about the motion vector difference and the information about the reference picture used to predict the current block may be encoded.

The predicted motion vector may be determined by selecting any one of the predicted motion vector candidates. In particular, information for identifying the selected predicted motion vector candidate is further encoded along with the information about the motion vector difference and the information about the reference picture which are to be used to predict the current block. The subtractor 130 may be configured to subtract the prediction block generated by the intra-predictor 122 or the inter-predictor 124 from the current block to generate a residual block.

The transformer 140 may be configured to split the residual block into one or more subblocks, and apply the transformation to the one or more subblocks, thereby transforming the residual values of the transform blocks from the sample domain to the frequency domain. In the frequency domain, the transformed blocks are referred to as coefficient blocks or transform blocks containing one or more transform coefficient values. A two-dimensional transform kernel may be used for transformation, and one-dimensional transform kernels may be used for horizontal transformation and vertical transformation, respectively. The transform kernels may be based on a discrete cosine transform (DCT), a discrete sine transform (DST), or the like.

The transformer 140 may be configured to transform residual signals in the residual block using the entire size of the residual block as a transformation unit. Alternatively, the residual block may be split into a plurality of subblocks, and the residual signals in the subblocks may be transformed using the subblock as a transformation unit. The transformer 140 may be configured to transform the residual block in the horizontal direction and the vertical direction individually. For transformation, various types of transform functions or transform matrices may be used. For example, pairs of transform functions for horizontal transformation and vertical transformation may be defined as a multiple transform set (MTS). The transformer 140 may be configured to select one pair of transform functions having the best transformation efficiency in the MTS, and transform the residual block in the horizontal and vertical directions, respectively. The information (mts_idx) on the transform function pair selected in the MTS may be encoded by the entropy encoder 155 and signaled to the video decoding apparatus.

The quantizer 145 may be configured to quantize transform coefficients output from the transformer 140 using quantization parameters, and output the quantized transform coefficients to the entropy encoder 155. For some blocks or frames, the quantizer 145 may be configured to directly quantize a related residual block without transformation. The quantizer 145 may be configured to apply different quantization coefficients (scaling values) according to the positions of the transform coefficients in a transform block. A matrix of quantized coefficients applied to the two-dimensionally arranged quantized transform coefficients may be encoded and signaled to the video decoding apparatus.

The rearrangement unit 150 may be configured to re-sort the coefficient values for the quantized residual value. The rearrangement unit 150 may be configured to change the 2-dimensional array of coefficients into a 1-dimensional coefficient sequence through coefficient scanning. For example, the rearrangement unit 150 may be configured to scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. In other words, a scan mode to be used may be determined among the zig-zag scan, the diagonal scan, the vertical scan and the horizontal scan according to the size of the transformation unit and the intra-prediction mode.

The entropy encoder 155 may be configured to encode the one-dimensional quantized transform coefficients output from the rearrangement unit 150 using uses various encoding techniques such as Context-based Adaptive Binary Arithmetic Code (CABAC) and exponential Golomb, to generate a bitstream. The entropy encoder 155 may be configured to encode information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the current block is encoded by intra-prediction or inter-prediction, and encodes intra-prediction information (i.e., information about an intra-prediction mode) or inter-prediction information (a merge index for the merge mode, information about a reference picture index and a motion vector difference for the AMVP mode) according to the prediction type. The entropy encoder 155 also encodes information related to quantization, that is, information about quantization parameters and information about a quantization matrix.

The inverse quantizer 160 may be configured to inversely quantize the quantized transform coefficients output from the quantizer 145 to generate transform coefficients. The inverse transformer 165 may be configured to transform the transform coefficients output from the inverse quantizer 160 from the frequency domain to the spatial domain and reconstruct the residual block. The adder 170 may be configured to add the reconstructed residual block to the prediction block generated by the predictor 120 to reconstruct the current block. The samples in the reconstructed current block may be used as reference samples in performing intra-prediction of a next block.

The loop filter unit 180 may be configured to filter the reconstructed samples to reduce blocking artifacts, ringing artifacts, and blurring artifacts generated due to block-based prediction and transformation/quantization. The loop filter unit 180 may include at least of a deblocking filter 182, a sample adaptive offset (SAO) filter 184, and an adaptive loop filter (ALF) 186.

The deblocking filter 182 may be configured to filter the boundary between the reconstructed blocks to remove blocking artifacts caused by block-by-block coding/decoding, and the SAO filter 184 may be configured to perform additional filtering on the deblocking-filtered video. The SAO filter 184 is a filter used to compensate for a difference between a reconstructed sample and an original sample caused by lossy coding, and performs filtering in a manner that adding a corresponding offset to each reconstructed sample. The ALF 186 may be configured to perform filtering on a target sample to be filtered by applying filter coefficients to the target sample and neighboring samples of the target sample.

The ALF 186 may be configured to divide the samples included in a picture into predetermined groups, and then determine one filter to be applied to a corresponding group to differentially perform filtering on each group. Information about filter coefficients to be used for the ALF may be encoded and signaled to the video decoding apparatus. The reconstructed blocks filtered through the loop filter unit 180 are stored in the memory 190. Once all blocks in one picture are reconstructed, the reconstructed picture may be used as a reference picture for inter-prediction of blocks in a picture to be encoded next.

Figure 5:
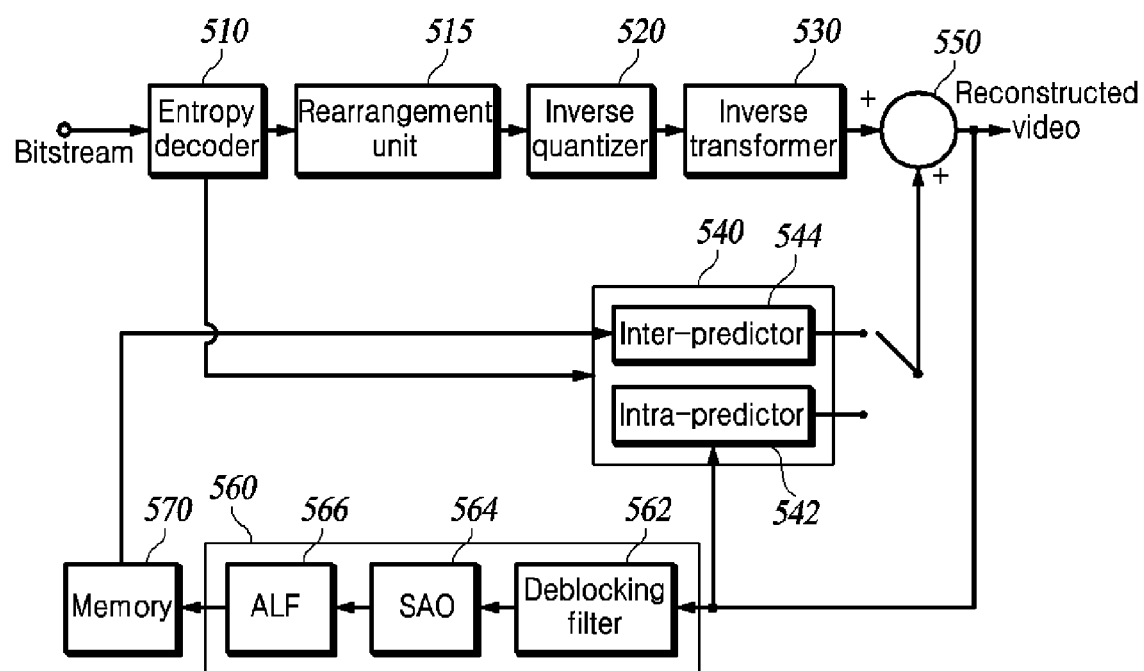
FIG. 5 is an exemplary block diagram of a video decoding apparatus capable of implementing the techniques of the present disclosure.

FIG. 5 is an exemplary functional block diagram of a video decoding apparatus capable of implementing the techniques of the present disclosure. Hereinafter, the video decoding apparatus and elements of the apparatus will be described with reference to FIG. 5. The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element. The entropy decoder 510 may be configured to determine a current block to be decoded by decoding a bitstream generated by the video encoding apparatus and extracting information related to block splitting, and extract prediction information and information about a residual signal, and the like required to reconstruct the current block.

The entropy decoder 510 may be configured to extract information about the CTU size from the sequence parameter set (SPS) or the picture parameter set (PPS), determines the size of the CTU, and splits a picture into CTUs of the determined size. Then, the decoder may be configured to determine the CTU as the uppermost layer, that is, the root node of a tree structure, and extract splitting information about the CTU to split the CTU using the tree structure. For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times. As another example, when the CTU is split using the QTBT structure, the first flag (QT_split_flag) related to QT splitting may be extracted, and each node may be split into four nodes of a lower layer. Then, a split flag (split_flag) indicating whether a node corresponding to a leaf node of QT may be further split in the BT and the splitting direction information are extracted.

Once the current block to be decoded is determined through splitting in the tree structure, the entropy decoder 510 may be configured to extract information about a prediction type indicating whether the current block is intra-predicted or inter-predicted. When the prediction type information indicates intra-prediction, the entropy decoder 510 extracts a syntax element for the intra-prediction information (intra-prediction mode) for the current block. When the prediction type information indicates inter-prediction, the entropy decoder 510 may be configured to extract a syntax element for the inter-prediction information, that is, information indicating a motion vector and a reference picture referred to by the motion vector.

The entropy decoder 510 may also be configured to extract information about quantized transform coefficients of the current block as information related to quantization and information about residual signals. The rearrangement unit 515 may be configured to change the sequence of the one-dimensional quantized transform coefficients entropy-decoded by the entropy decoder 510 to a 2-dimensional coefficient array (i.e., block) in a reverse order of the coefficient scanning performed by the video encoding apparatus.

The inverse quantizer 520 may be configured to inversely quantize the quantized transform coefficients using the quantization parameter. The inverse quantizer 520 may be configured to apply different quantization coefficients (scaling values) to the quantized transform coefficients arranged in two dimensions. The inverse quantizer 520 may be configured to perform inverse quantization by applying a matrix of quantization coefficients (scaling values) from the video encoding apparatus to a two-dimensional array of quantized transform coefficients.

The inverse transformer 530 may be configured to inversely transform the inversely quantized transform coefficients from the frequency domain to the spatial domain to reconstruct residual signals, thereby generating a reconstructed residual block for the current block. In addition, when the MTS is applied, the inverse transformer 530 may be configured to determine transform functions or transform matrices to be applied in the horizontal and vertical directions, respectively, using the MTS information (mts_idx) signaled from the video encoding apparatus, and use the determined transform functions to inversely transform the transform coefficients in the transform block in the horizontal and vertical directions.

The predictor 540 may include an intra-predictor 542 and an inter-predictor 544. The intra-predictor 542 may be activated when the prediction type of the current block is intra-prediction, and the inter-predictor 544 may be activated when the prediction type of the current block is inter-prediction. The intra-predictor 542 may be configured to determine an intra-prediction mode of the current block among a plurality of intra-prediction modes based on the syntax element for the intra-prediction mode extracted from the entropy decoder 510, and predict the current block using the reference samples around the current block according to the intra-prediction mode.

The inter-predictor 544 may be configured to determine a motion vector of the current block and a reference picture referred to by the motion vector using the syntax element for the intra-prediction mode extracted from the entropy decoder 510, and predict the current block based on the motion vector and the reference picture. The adder 550 may be configured to reconstruct the current block by adding the residual block output from the inverse transformer and the prediction block output from the inter-predictor or the intra-predictor. The samples in the reconstructed current block may be used as reference samples in intra-predicting a block to be decoded next.

The loop filter unit 560 may include at least one of a deblocking filter 562, an SAO filter 564, and an ALF 566. The deblocking filter 562 deblocking-filters the boundary between the reconstructed blocks to remove blocking artifacts caused by block-by-block decoding. The SAO filter 564 performs filtering in a manner of adding the reconstructed block after deblocking filtering to corresponding offsets so as to compensate for a difference between the reconstructed sample and the original sample caused by lossy coding. The ALF 566 performs filtering on a target sample to be filtered by applying filter coefficients to the target sample and neighboring samples of the target sample. The ALF 566 may be configured to divide the samples in a picture into predetermined groups, and then determine one filter to be applied to a corresponding group to differentially perform filtering on each group. The filter coefficient of the ALF may be determined based on the information about the filter coefficient decoded from the bitstream. The reconstructed block filtered through the loop filter unit 560 is stored in the memory 570. When all blocks in one picture are reconstructed, the reconstructed picture may be used as a reference picture for inter-prediction of blocks in a picture to be encoded next.

The following disclosure relates to coding tools for improving compression performance of inter-prediction, which may be operated by the inter-predictor 124 of the video encoding apparatus and the inter-predictor 544 of the video decoding apparatus. As used herein, the term "target block" may have the same meaning as the terms "current block" or "coding unit (CU)" used above, or may mean a partial region of a CU.

I. Combined Inter-Intra Prediction

As described above, the target block may be predicted through one of inter-prediction and intra-prediction. Combined inter-intra prediction described in the present disclosure is a technique of complementing an inter-prediction signal using an intra-prediction signal. When the combined inter-intra prediction is applied, the inter-predictor 124 of the video encoding apparatus may be configured to determine a motion vector of the target block and predict the target block using the determined motion vector to generate a first prediction block. The intra-predictor 124 of the video encoding apparatus may be configured to predict the target block using reference samples around the target block and generate a second prediction block. As the intra-prediction mode used to generate the second prediction block, any one of the plurality of intra-prediction modes described above may be fixedly used. For example, the planar mode or the DC mode may be used as a prediction mode for generating the second prediction block. The final prediction block may be generated by an average or weighted average of the first prediction block and the second prediction block. An equation for calculating the final prediction block in the combined inter-intra prediction is given as follows.

$$P_{final}=((4-wt)*P_{inter}+wt*P_{intra}+2)>>2 \quad \text{Equation 1}$$

wherein, $P_{inter}$ denotes the first prediction block generated through inter-prediction, and $P_{intra}$ denotes the second prediction block generated through intra-prediction. Additionally, wt denotes a weight and +2 is an offset for the rounding-off operation.

The weight may be determined based on whether inter-prediction or intra-prediction may be used to predict pre-encoded/decoded neighboring blocks adjacent to the target block. For example, when both the left block and the above block of the target block are intra-predicted, a larger weight is given to the second prediction block ($P_{intra}$). For example, wt is set to 3. When only one of the left block and the above block is intra-predicted, the same weight is given to the first prediction block ($P_{inter}$) and the second prediction block ($P_{intra}$). For example, wt is set to 2. When neither the left block nor the above block is intra-predicted, a larger weight is given to the first prediction block ($P_{inter}$). For example, wt is set to 1.

When the target block is predicted through combined inter-intra prediction, the inter-predictor 544 of the video decoding apparatus may be configured to extract information about the motion vector of the target block from a bitstream to determine the motion vector of the target block. Then, the target block may be predicted in the same manner as in the video encoding apparatus.

The combined inter-intra prediction is a technique of complementing an inter-prediction signal with an intra-prediction signal, and thus may be efficient when the inter-prediction is more or less incorrect, for example, when the motion vector of the target block is determined by the merge mode. Therefore, the combined inter-intra prediction may be applied only when the motion vector of the target block is determined by the merge mode.

II. Bi-Directional Optical Flow

Bi-directional optical flow is a technique for additionally compensating for motions of samples predicted using bi-directional motion prediction, on the assumption that samples or objects constituting a video moves at a constant speed and that there is little change in sample values.

Figure 6:
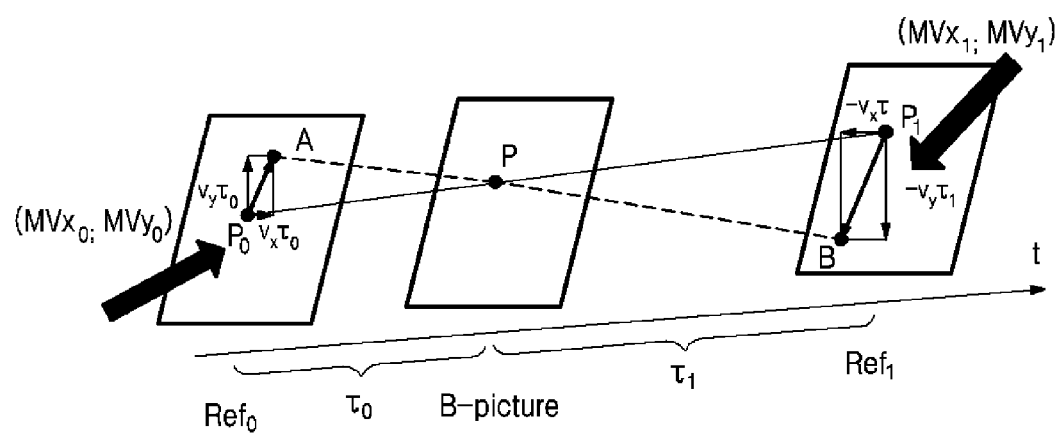
FIG. 6 is an exemplary diagram illustrating the concept of bi-prediction optical flow provided by the present disclosure.

FIG. 6 is an exemplary diagram illustrating the basic concept of BIO. Suppose that bi-directional motion vectors MV0 and MV1 pointing to corresponding regions (i.e., reference blocks) most similar to the to-be-encoded target block in the current picture have been determined in the reference pictures Ref0 and Ref1 by (normal) bi-directional motion prediction for the target block. The two motion vectors have values representing the motion of the entire target block. In the example of FIG. 6, $P_0$ is a sample in the reference picture $Ref_0$ indicated by the motion vector $MV_0$ and corresponding to sample P in the target block, and $P_1$ is a sample in the reference picture $Ref_1$ indicated by the motion vector $MV_1$ and corresponding to sample P in the target block.

Further, suppose that motion for sample P in FIG. 6 is slightly different from the overall motion of the target block. For example, when an object located at sample A in $Ref_0$ of FIG. 6 moves to sample B in $Ref_1$ via sample P in the target block of the current picture, sample A and sample B may have values quite similar to each other. Additionally, in this case, a point in $Ref_0$ most similar to sample P in the target block is not $P_0$ indicated by the bi-directional motion vector $MV_0$, but sample A which has been shifted from $P_0$ by a predetermined displacement vector $(v_x t_0, v_y t_1)$. A point in $Ref_1$ most similar to sample P in the target block is not $P_1$ indicated by the bi-directional motion vector $MV_1$, but sample B which has been shifted from $P_1$ by a predetermined displacement vector $(-v_x t_0, -v_y t_1)$. Here, $t_0$ and $t_1$ denote time-axis distances of $Ref_0$ and $Ref_1$ with respect to the current picture, respectively, and are calculated based on picture order count (POC). Hereinafter, $(v_x, v_y)$ is referred to as an "optical flow."

In predicting the value of sample P of the current block in the current picture, two reference samples A and B enables more accurate prediction than reference samples $P_0$ and $P_1$ indicated by the bi-directional motion vectors $MV_0$ and $MV_1$. $I^{(0)}(i,j)$ denotes a value of a sample in the reference picture $Ref_0$ indicated by the motion vector $MV_0$ as corresponding to the sample (i,j) in the target block, and $I^{(1)}(i,j)$ denotes a value of a sample in the reference picture $Ref_1$ indicated by the motion vector $MV_1$ as corresponding to the sample (i,j) in the target block.

The value of sample A in the reference picture $Ref_0$ indicated by a BIO motion vector $(v_x, v_y)$ as corresponding to the sample in the target block may be defined as $I^{(0)}(i+v_x t_0, j+v_y t_0)$, and the value of sample B in the reference picture $Ref_1$ may be defined as $I^{(1)}(i-v_x t_1, j-v_y t_1)$. When linear approximation is performed using only the first-order term of the Taylor series, A and B may be expressed as Equation 2.

$$A = I^{(0)}(i + v_x \tau_0, j + v_y \tau_0)$$ Equation 2
$$\approx I^{(0)}(i, j) + v_x \tau_0 I_x^{(0)}(i, j) + v_y \tau_0 I_y^{(0)}(i, j)$$
$$B = I^{(1)}(i - v_x \tau_1, j - v_y \tau_1)$$
$$\approx I^{(1)}(i, j) - v_x \tau_1 I_x^{(1)}(i, j) - v_y \tau_1 I_y^{(1)}(i, j)$$

wherein, $I_x^{(k)}$ and $I_y^{(k)}$ (k=0, 1) are gradient values in the horizontal and vertical directions at position (i, j) of $Ref_0$ and $Ref_1$. Additionally, $t_0$ and $t_1$ denote time-axis distances of $Ref_0$ and $Ref_1$ with respect to the current picture, respectively, and may be calculated based on POC: $t_0$=POC(current)−POC($Ref_0$), and $t_1$=POC($Ref_1$)−POC(current).

The bi-directional optical flow $(v_x, v_y)$ of each sample in a block is determined as a solution that minimizes Δ, which is defined as a difference between sample A and sample B. Δ may be defined by Equation 3 using the linear approximation of A and B derived from Equation 2.

$$\Delta = A - B$$ Equation 3
$$= \left(I^{(0)} - I^{(1)}\right) + v_x\left(\tau_0 I_x^{(0)} + \tau_1 I_x^{(1)}\right) + v_y\left(\tau_0 I_y^{(0)} + \tau_1 I_y^{(1)}\right)$$

For simplicity, the sample position (i, j) is omitted from each term of Equation 3.

To implement more robust optical flow estimation, it is assumed that the motion is locally consistent with neighboring samples. For the BIO motion vector for a sample (i, j) that is currently to be predicted, the differences Δ in Equation 3 for all samples (i', j') present in a mask Ω of a certain size centered on the sample (i, j) are considered. In other words, the optical flow for the current sample (i, j) may be determined as a vector that minimizes the objective function $\Phi(v_x, v_y)$, which is the sum of squares of the differences Δ[i', j'] obtained for the respective samples in the mask Ω, as shown in Equation 4.

$$\Phi(v_x, v_y) = \sum_{[i',j'] \in \Omega} \Delta^2[i', j']$$ Equation 4

The bi-directional optical flow of the present disclosure may be applied in the case where one of two reference pictures used for bi-directional prediction precedes the current picture in display order, the other one follows the current picture, and the distances from the two reference pictures to the current picture are equal to each other, that is, the differences in picture order count (POC) between each reference picture and the current picture are equal to each other. Therefore, $t_0$ and $t_1$ may be ignored.

In addition, the bi-directional optical flow of the present disclosure may be applied only to luma components. The bi-directional optical flow of the present disclosure is performed on a subblock basis, not pixel basis, for the target block to which bi-directional prediction is applied. In the following description, the subblock, which can have various sizes of 2×2, 4×4, and 8×8, is assumed to have a size of 4×4 for simplicity.

Before performing the optical flow, the inter-predictor 124 of the video encoding apparatus generates two reference blocks for the target block using the fore-mentioned bi-directional prediction. The first reference block of the two reference blocks represents a block composed of predicted samples generated from the reference picture $Ref_0$ using the first motion vector $MV_0$ of the target block, and the second reference block represents a block composed of predicted samples generated from the reference picture $Ref_1$ using the motion vector $MV_1$.

The inter-predictor 124 may be configured to calculate $(v_x, v_y)$ referred to as an optical flow for each of 4×4 subblocks constituting the target block, using horizontal and vertical gradient values of predicted samples in the first reference block and the second reference block. The optical flow $(v_x, v_y)$ is determined such that the difference between the predicted samples from the reference picture $Ref_0$ and the predicted samples from the reference picture $Ref_1$ is minimized. The inter-predictor 124 may be configured to derive a sample offset for modifying bi-directional predicted samples for the 4×4 subblock, by using ($v_x$, $v_y$) calculated for the 4×4 subblock and gradients of the predicted samples in the 4×4 subblock.

Specifically, the inter-predictor 124 calculates the horizontal and vertical gradients of sample values at position (i, j) using Equation 5.

$$\frac{\partial I^{(k)}}{\partial x}(i, j) = \left(I^{(k)}(i+1, j) - I^{(k)}(i-1, j)\right) \gg \text{shift1}$$

$$\frac{\partial I^{(k)}}{\partial y}(i, j) = \left(I^{(k)}(i, j+1) - I^{(k)}(i, j-1)\right) \gg \text{shift1}$$

Equation 5 wherein, k is 0 or 1, and $I^{(0)}(i,j)$ and $I^{(1)}(i,j)$ denote sample values at position (i,j) in the first reference block and the second reference block, respectively. Shift1 is a value derived from bit-depth for a luma component, for example shift1=max(6, bitDepth−6).

Figure 7:
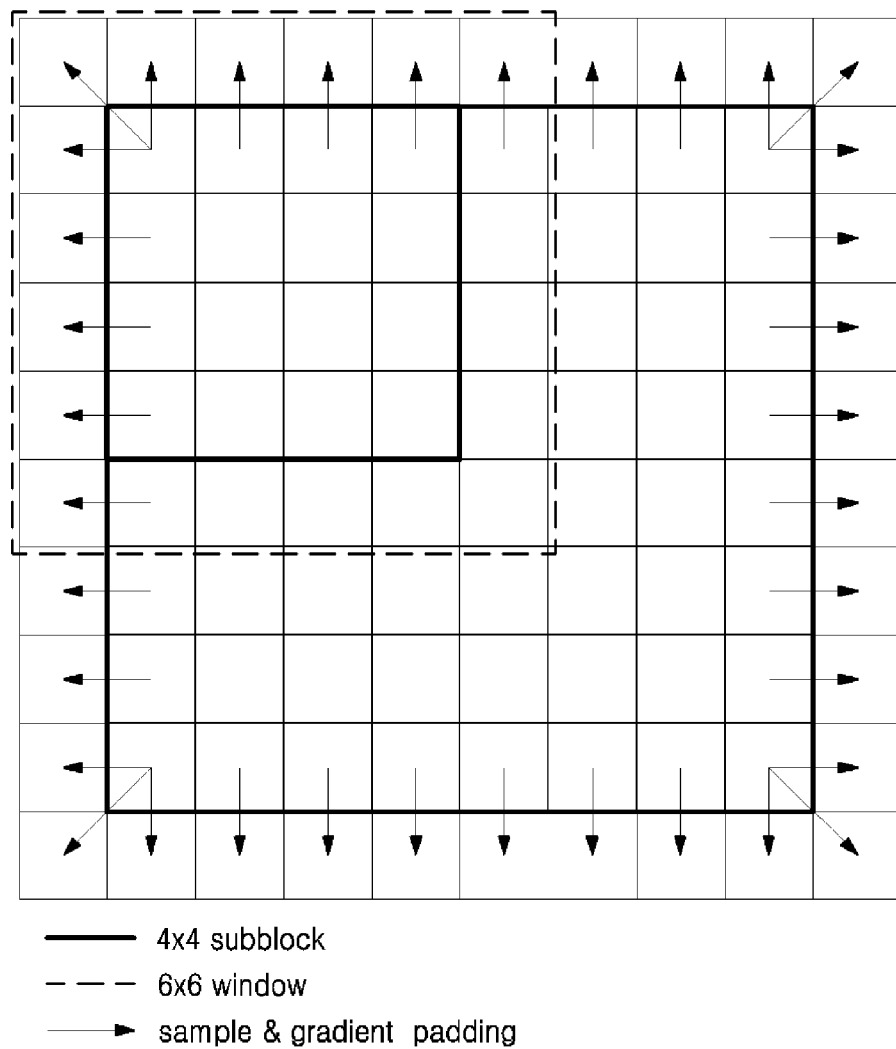
FIG. 7 is an exemplary diagram illustrating a method of deriving a gradient for a block boundary sample in the bi-directional optical flow.

To derive a gradient of a sample located at the boundary of each reference block, samples outside the boundary of the first reference block and the second reference block are needed. Accordingly, as shown in FIG. 7, each reference block is extended by one column to the left and right and by one row to the upper side and lower side. To reduce the amount of computation, each sample in the extended portion may be padded with a sample or integer sample at the nearest position in the reference block. Additionally, gradients at a sample position outside the boundary of each reference block may be padded with gradients corresponding to samples at the nearest position.

The inter-predictor 124 may be configured to calculate S1, S2, S3, S5, and S6 corresponding to auto-correlation and cross-correlation of gradients using the horizontal and vertical gradients in a 6×6 window covering a 4×4 subblock as shown in FIG. 7.

$$S_1 = \sum_{(i,j) \in \Omega} \psi_x(i, j) \cdot \psi_x(i, j), \quad S_3 = \sum_{(i,j) \in \Omega} \theta(i, j) \cdot \psi_x(i, j)$$

$$S_2 = \sum_{(i,j) \in \Omega} \psi_x(i, j) \cdot \psi_y(i, j)$$

$$S_5 = \sum_{(i,j) \in \Omega} \psi_y(i, j) \cdot \psi_y(i, j), \quad S_6 = \sum_{(i,j) \in \Omega} \theta(i, j) \cdot \psi_y(i, j)$$

wherein, $\Omega$ denotes a window covering the subblock. In addition, as shown in Equation 7 below, $\Psi_x(i,j)$ denotes the sum of the horizontal gradient values at position (i,j) in the first reference block and the second reference block, $\Psi_y(i,j)$ denotes the sum of the vertical gradient values at position (i,j) position in the first reference block and the second reference block, and $\theta(i,j)$ denotes a difference between the sample value at position (i,j) in the second reference block and the sample value at position (i,j) in the first reference block.

$$\psi_x(i, j) = \left(\frac{\partial I^{(1)}}{\partial x}(i, j) + \frac{\partial I^{(0)}}{\partial x}(i, j)\right) \gg n_a$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = \left(I^{(1)}(i, j) \gg n_b\right) - \left(I^{(0)}(i, j) \gg n_b\right)$$

Equation 7 wherein, $n_a$ and $n_b$ are values derived from the bit-depth, and have values of min(1, bitDepth−11) and min(4, bitDepth−8).

The inter-predictor 124 may be configured to calculate the optical flows ($v_x$, $v_y$) for the 4×4 subblock using Equation 8 based on S1, S2, S3, S5, and S6.

$$v_x = S_1 > 0 ? \text{clip3}(-th_{BIO}', th_{BIO}', -((S_3 \cdot 2^{n_b-n_a}) \gg \lfloor \log_2 S_1 \rfloor)):0$$

$$v_y = S_5 > 0 ? \text{clip3}(-th_{BIO}', th_{BIO}', -((S_6 \cdot 2^{n_b-n_a} - ((v_x S_{2,m}) \ll n_{S_2} + v_x S_{2,s})/2) \gg \lfloor \log_2 S_5 \rfloor)):0$$

Equation 8 wherein, $S_{2,m} = S_2 \gg n_{S_2}$, $$S_{2,s} = S_2 \& (2^{n_{S_2}} - 1),$$

and $th_{BIO}' = 2^{max(5, BD-7)}$. Additionally, $\lfloor \cdot \rfloor$ is a floor function, and $n_{S_2} = 12$.

The sample offset for modifying the predicted sample at each sample position (x, y) in the 4×4 subblock in the target block may be calculated using the optical flow calculated for the 4×4 subblock and gradient values at the sample position (x, y), as shown in Equation 9. In Equation 9, rnd( ) represents a round-off operation.

$$b(x, y) = rnd\left(\left(v_x\left(\frac{\partial I^{(1)}(x, y)}{\partial x} - \frac{\partial I^{(0)}(x, y)}{\partial x}\right)\right)/2\right) + rnd\left(\left(v_y\left(\frac{\partial I^{(1)}(x, y)}{\partial y} - \frac{\partial I^{(0)}(x, y)}{\partial y}\right)\right)/2\right)$$

Equation 9

The inter-predictor 124 may be configured to generate a final predicted sample pred(x,y) using the sample offset b(x,y) at position (x, y), and predicted samples $I^{(0)}(x,y)$ and $I^{(1)}(x,y)$ in the first reference block and the second reference block, as in Equation 10.

$$\text{pred}(x,y) = (I^{(0)}(x,y) + I^{(1)}(x,y) + b(x,y) + o_{offset}) \gg \text{shift}$$

Equation 10 wherein, shift is Max(3, 15−BitDepth), and $O_{offset}$ is a value for a rounding-off operation and is half the shift.

As described above, the bi-directional optical flow technique uses values of samples predicted using motion information (two motion vectors and two reference pictures) used for bi-directional prediction. Therefore, the inter-predictor 544 of the video decoding apparatus may also be configured to perform the bi-directional optical flow in the same manner as the video encoding apparatus, using the motion information (motion vectors, reference pictures) for bi-directional prediction received from the video encoding apparatus. It is not required that the video encoding apparatus signals additional information for the bi-directional optical flow process to the video decoding apparatus.

The bi-directional optical flow technique described above may be applied to the chroma component. In particular, to reduce the computational complexity, the optical flow calculated for the luma component may be used as the optical flow for the chroma component without recalculating the optical flow ($v_x$, $v_y$) for the chroma component. Therefore, when the bi-directional optical flow is applied for the chroma component, only the horizontal and vertical gradients of the chroma component of each sample need to be calculated.

The bi-directional optical flow may be restricted from being used together with the combined inter-intra prediction technique. In the intra-prediction, pre-reconstructed samples around the target block are used, and accordingly prediction for the target block is possible after decoding (sample reconstruction) of the neighboring blocks is completed.

Therefore, when both the combined inter-intra prediction and the bi-directional optical flow are applied, the bi-directional optical flow process should be stopped until intra-prediction of the target block may be performed after decoding for all the neighboring blocks of the target block is completed. This may lead to substantial delays in the decoding process. Accordingly, the bi-directional optical flow may not be applied to a block to which combined inter-intra prediction is applied.

In addition, the bi-directional optical flow may be restricted from being used together with local illumination compensation, which will be described later. For example, when local illumination compensation is applied, the bi-directional optical flow is not applied. In addition, application of the bi-directional optical flow may be restricted depending on the size of the target block. For example, the bi-directional optical flow may not be applied, when the height of the target block is 4, or when the width and height of the target block are 4 and 8, respectively.

III. Affine Motion Prediction

The inter-prediction described above is motion prediction reflecting a translation motion model. In other words, it is a technique for predicting motion in the horizontal direction (x-axis direction) and the vertical direction (y-axis direction). However, in practice, there may be various types of motions such as rotation, zoom-in, or zoom-out in addition to the translational motion. One aspect of the present disclosure provides affine motion prediction capable of covering such various types of motions.

Figure 8A:
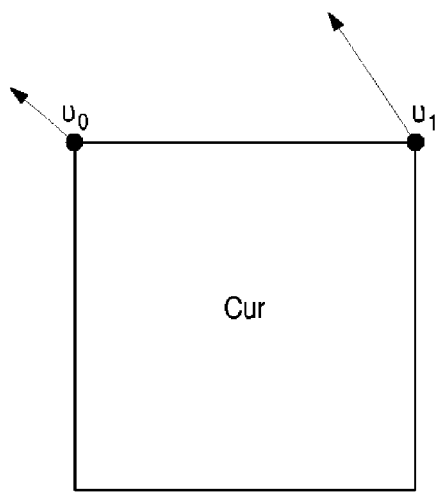
FIGS. 8A-8B and 9 are exemplary diagrams illustrating affine motion prediction provided by the present disclosure.
Figure 8B:
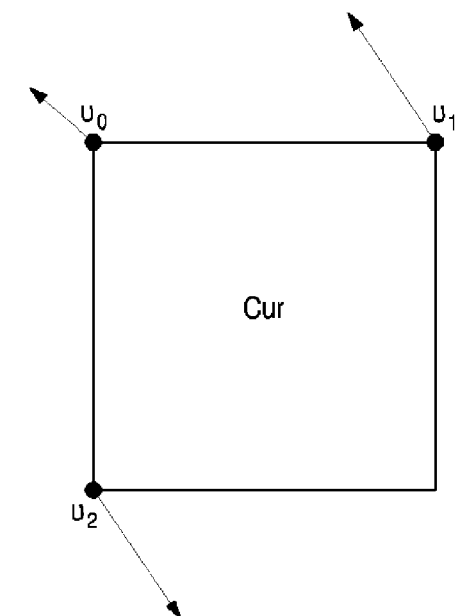

FIGS. 8A-8B are exemplary diagrams illustrating affine motion prediction. There may be two types of models for affine motion prediction. One is a model using the motion vectors of two control points of the top-left corner and top-right corner of a target block to be currently encoded, that is, four parameters, as shown in FIG. 8A. The other model is a model using the motion vectors of three control points of the top-left corner, top-right corner and bottom-left corner of the target block, that is, six parameters, as shown in FIG. 8B.

The four-parameter affine model is expressed by Equation 11. The motion at the sample position (x, y) in the target block may be calculated by Equation 11. In particular, the position of the above left sample of the target block is assumed to be (0, 0).

$$\begin{cases} mv_x = \dfrac{mv_{1x} - mv_{0x}}{W}x + \dfrac{mv_{0y} - mv_{1y}}{W}y + mv_{0x} \\ mv_y = \dfrac{mv_{1y} - mv_{0y}}{W}x + \dfrac{mv_{1x} - mv_{0x}}{W}y + mv_{0y} \end{cases} \quad \text{Equation 11}$$

The six-parameter affine model is expressed by Equation 12. The motion at the sample position (x, y) in the target block may be calculated by Equation 12.

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{Equation 12}$$

wherein, ($mv_{0x}$, $mv_{0y}$) is the motion vector of the top-left corner control point, ($mv_{1x}$, $mv_{1y}$) is the motion vector of the top-right corner control point, and ($mv_{2x}$, $mv_{2y}$) is the motion vector of the bottom-left corner control point. Additionally, W is a constant determined from the horizontal length of the target block, and H is a constant determined from the vertical length of the target block.

Figure 9:
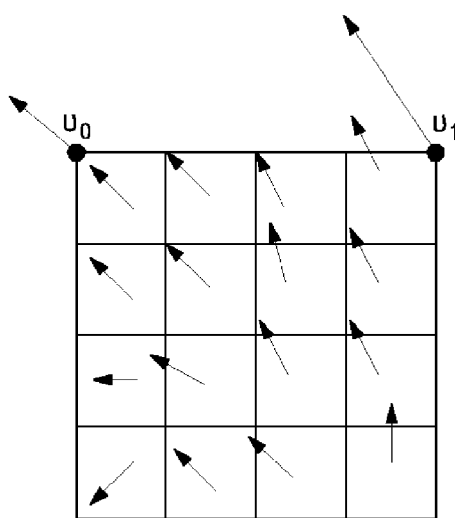

The affine motion prediction may be performed for each sample in the target block using a motion vector calculated through Equation 11 or Equation 12. Alternatively, to reduce the computational complexity, the prediction may be performed for each subblock split from the target block as shown in FIG. 9. For example, the size of the subblock may be 4×4, 2×2, or 8×8. In an exemplary embodiment below, the affine motion prediction for the target block is performed on a 4×4 subblock basis. This example is for convenience of explanation only and the present disclosure is not limited thereto.

In the subblock-based affine motion prediction, the motion vector (affine motion vector) of each subblock may be calculated by substituting the center position of each subblock in (x, y) of Equation 11 or 12. In particular, the center position may be an actual center point of the subblock or the bottom-right sample position of the center point. For example, in the case of a 4×4 subblock in which the coordinates of the bottom-left sample are (0, 0), the center position of the subblock may be (1.5, 1.5) or (2, 2). The predicted block for each subblock may be generated using the affine motion vector ($mv_x$, $mv_y$) of the subblock.

The motion vectors ($mv_x$, $mv_y$) may be set to have 1/16 sample precision. In particular, the motion vector ($mv_x$, $mv_y$) calculated through Equation 11 or 12 may be rounded in 1/16 sample units. Adaptive motion vector resolution may be applied to the affine motion prediction as in the normal inter-prediction. In particular, information about the motion vector resolution of the target block, that is, the precision of the motion vector, may be signaled for each target block.

The affine motion prediction may be performed for not only the luma component but also the chroma component. In the case of a 4:2:0 video format, when affine motion prediction for the luma component may be performed on a 4×4 subblock basis, affine motion prediction for the chroma component may be performed on a 2×2 subblock basis. The motion vector ($mv_x$, $mv_y$) of each subblock of the chroma component may be derived from the motion vector of the corresponding luma component. Alternatively, the size of the subblock for affine motion prediction of the chroma component may be the same as that for the luma component.

When affine motion prediction for the luma component may be performed on a 4×4 subblock basis, affine motion prediction for the chroma component may also be performed on the 4×4 subblock basis. In particular, since the 4×4 subblock for the chroma component corresponds to four 4×4 subblocks for the luma component, the motion vector ($mv_x$, $mv_y$) for the subblock of the chroma component may be calculated by calculating the average of the motion vectors of the four corresponding subblocks of the luma component.

The video encoding apparatus may be configured to perform intra-prediction, inter-prediction (translational motion prediction), affine motion prediction, and the like, and calculate a rate-distortion (RD) cost to select an optimal prediction method. To perform affine motion prediction, the inter-predictor 124 of the video encoding apparatus may determine which of the two types of models to use, and determine two or three control points according to the determined type. The inter-predictor 124 may be configured to calculate the motion vector ($mv_x$, $mv_y$) for each of 4×4 subblocks in the target block using the motion vectors of the control points. Then, the inter-predictor 124 may be configured to perform motion compensation in a reference picture on a subblock-by-subblock basis using the motion vector ($mv_x$, $mv_y$) of each subblock to generate a predicted block for each subblock in the target block.

The entropy encoder 155 of the video encoding apparatus may be configured to encode affine related syntax elements including a flag indicating whether affine motion prediction is applied to the target block, type information indicating a type of the affine model, and motion information indicating a motion vector of each control point, and transmit the same to the video decoding apparatus. The type information and the motion information about the control points may be signaled when affine motion prediction is performed, and as many motion vectors of the control points as a number determined according to the type information may be signaled. In addition, when adaptive motion vector resolution is applied, motion vector resolution information about the affine motion vector of the target block may be signaled.

The video decoding apparatus may be configured to determine the type of the affine model and the control point motion vectors using the signaled syntax elements, and calculate the motion vector ($mv_x$, $mv_y$) for each 4×4 subblock in the target block using Equation 11 or 12. When the motion vector resolution information about the affine motion vector of the target block is signaled, the motion vector ($mv_x$, $mv_y$) may be corrected to a precision identified by the motion vector resolution information through operations such as rounding-off.

The video decoding apparatus may be configured to generate a predicted block for each subblock by performing motion compensation within a reference picture using the motion vector ($mv_x$, $mv_y$) for each subblock. To reduce the amount in bits required to encode the motion vectors of control points, a method as used in the above-described normal inter-prediction (translational motion prediction) may be applied.

As an example, in the merge mode, the inter-predictor 124 of the video encoding apparatus may be configured to derive a motion vector of each control point from neighboring blocks of the target block. For example, the inter-predictor 124 may be configured to generate a merge candidate list by deriving a predefined number of merge candidates from neighboring samples L, BL, A, AR, and AL of the target block illustrated in FIG. 4. Each of the merge candidates included in the list corresponds to a pair of motion vectors of two or three control points.

First, the inter-predictor 124 may be configured to derive a merge candidate from the control point motion vectors of the neighboring blocks predicted in the affine mode among the neighboring blocks. In some exemplary embodiments, the number of merge candidates derived from neighboring blocks predicted in the affine mode may be limited. For example, the inter-predictor 124 may be configured to derive two merge candidates from the neighboring blocks predicted in the affine mode: one of L and BL and one of A, AR, and AL. The priority may be assigned in order of L and BL and in order of A, AR and AL. When the total number of merge candidates is greater than or equal to 3, the inter-predictor 124 may be configured to derive a necessary number of merge candidates from the translational motion vectors of the neighboring blocks.

Figure 10:
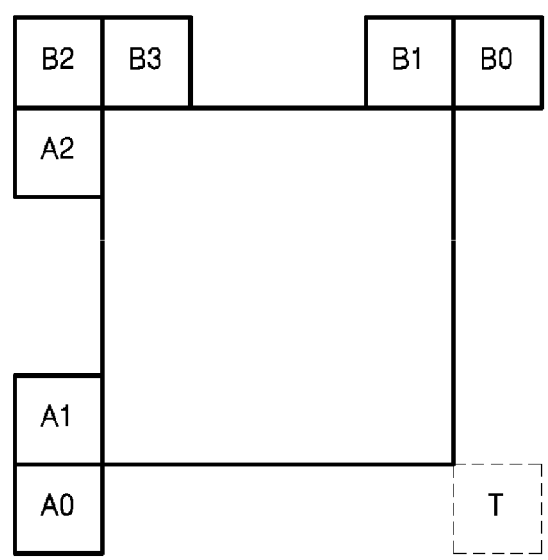
FIG. 10 is an exemplary diagram illustrating a method of deriving merge candidates for affine motion prediction from translation motion vectors of neighboring blocks.

FIG. 10 is an exemplary diagram illustrating a method of deriving merge candidates for affine motion prediction from translation motion vectors of neighboring blocks. The inter-predictor 124 may be configured to derive control point motion vectors CPMV1, CPMV2, CPMV3 from a neighboring block group {B2, B3, A2}, a neighboring block group {B1, B0}, and a neighboring block group {A1, A0}, respectively. As an example, the priorities in each neighboring block group may be assigned in order of B2, B3, A2, order of B1 and B0, and order of A1 and A0. In addition, another control point motion vector CPMV4 may be derived from a collocated block T in the reference picture. The inter-predictor 124 may be configured to generate as many merge candidates as necessary through combinations of two or three control point motion vectors among the four control point motion vectors. The priorities of the combinations are assigned as shown below. The elements in each group are listed in order of the top-left corner, top-right corner, and bottom-left corner control point motion vectors.

{CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2}, {CPMV1, CPMV3}

The inter-predictor 124 may be configured to select a merge candidate in the merge candidate list and perform affine motion prediction on the target block. When the selected candidate consists of two control point motion vectors, affine motion prediction may be performed using a four-parameter model. On the other hand, when the selected candidate consists of three control point motion vectors, affine motion prediction may be performed using a six-parameter model. The entropy encoder 155 of the video encoding apparatus encodes index information indicating the selected merge candidate among the merge candidates in the merge candidate list and signals the same to the video decoding apparatus.

The entropy decoder 510 of the video decoding apparatus may be configured to decode the index information signaled from the video encoding apparatus. The inter-predictor 544 of the video decoding apparatus may be configured to construct a merge candidate list in the same manner as the video encoding apparatus, and perform affine motion prediction using control point motion vectors corresponding to the merge candidate indicated by the index information.

As another example, in the AMVP mode, the inter-predictor 124 of the video encoding apparatus may be configured to determine the type of the affine model and control point motion vectors for the target block. Then, the inter-predictor 124 may be configured to calculate motion vector differences, which are differences between the actual control point motion vectors of the target block and the predicted motion vectors of the respective control points, and transmit the motion vector differences which respectively correspond to the control points. Accordingly, the inter-predictor 124 of the video encoding apparatus configures a list of a predefined number of affine AMVPs. When the target block is of a 4-parameter type, the candidates included in the list are each composed of a pair of two control point motion vectors. On the other hand, when the target block is of a 6-parameter type, the candidates included in the list are each composed of a pair of three control point motion vectors. The affine AMVP list may be derived using control point motion vectors or translational motion vectors of neighboring blocks in a manner similar to the method of constructing a merge candidate list described above.

However, to derive candidates to be included in the affine AMVP list, there may be a restriction of considering only neighboring blocks that refer to the same reference picture as the target block among the neighboring blocks of FIG. 4. In addition, in the AMVP mode, the affine model type of the target block should be considered. When the affine model type of the target block is a 4-parameter type, the video encoding apparatus may be configured to derive two control point motion vectors (top-left corner and top-right corner control point motion vectors of the target block) using the affine model of a neighboring block. When the affine model type of the target block is a 6-parameter type, the apparatus derives three control point motion vectors (top-left corner, top-right corner and bottom-left control point motion vectors of the target block) using the affine model of a neighboring block.

When the neighboring block is of the 4-parameter type, two or three control point motion vectors may be predicted according to the affine model type of the target block using two control point motion vectors of the neighboring block. For example, an affine model of a neighboring block expressed by Equation 11 may be used. In Equation 11, ($mv_{0x}$, $mv_{0y}$) and ($mv_{1x}$, $mv_{1y}$) are replaced by the top-left corner and top-right corner control point motion vectors of the neighboring block, respectively. W is replaced by the horizontal length of the neighboring block. The predicted motion vector for each control point of the target block may be derived by inputting, into (x, y), the difference between the position of the corresponding control point of the target block and the position of the top-left corner of the neighboring block.

When the neighboring block is of the 6-parameter type, two or three control point motion vectors may be predicted according to the affine model type of the target block using three control point motion vectors of the neighboring block. For example, an affine model of a neighboring block expressed by Equation 12 may be used. In Equation 12, ($mv_{0x}$, $mv_{0y}$), ($mv_{1x}$, $mv_{1y}$), and ($mv_{2x}$, $mv_{2y}$) are replaced by control point motion vectors of the top-left corner, top-right corner and bottom-left corner of the neighboring block, respectively. W and H are replaced by the horizontal length and vertical length of the neighboring block, respectively. The predicted motion vector for each control point of the target block may be derived by inputting, into (x, y), the difference between the position of the corresponding control point of the target block and the position of the top-left corner of the neighboring block.

The inter-predictor 124 of the video encoding apparatus may be configured to select one candidate in the affine AMVP list, and generate motion vector differences between the motion vector of each actual control point and the predicted motion vector of the corresponding control point of the selected candidate. The entropy encoder 155 of the video encoding apparatus encodes type information indicating the affine model type of the target block, index information indicating a selected candidate among the candidates in the affine AMVP list, and a motion vector difference corresponding to each control point and transmit the same to the video decoding apparatus.

The inter-predictor 544 of the video decoding apparatus may be configured to determine the affine model type using the information signaled from the video encoding apparatus, and generate a motion vector difference of each control point. Then, the inter-predictor may be configured to generate an affine AMVP list in the same manner as the video encoding apparatus, and select a candidate indicated by the index information signaled in the affine AMVP list. The inter-predictor 544 of the video decoding apparatus may be configured to calculate a motion vector of each control point by adding the predicted motion vector of each control point of the selected candidate and a corresponding motion vector difference.

IV. Sample-by-Sample Adjustment for Affine Motion Prediction Samples

Subblock-by-subblock affine motion prediction for a target block has been described above. Another aspect of the present disclosure relates to adjusting, on a sample-by-sample basis, sample values of predicted samples generated by subblock-by-subblock affine motion prediction. The motion according to the position of each sample is additionally compensated in each subblock that forms the basis of affine motion prediction.

When the sample values in any one subblock generated as a result of subblock-by-subblock affine motion prediction for a target block are I(x, y), the video encoding apparatus calculates the horizontal and vertical gradients $g_x(i,j)$ and $g_y(i,j)$ at each sample position. Equation 13 may be used to calculate the gradients.

$$g_x(i,j)=I(i+1,j)-I(i-1,j)$$

$$g_y(i,j)=I(i,j+1)-I(i,j-1) \quad \text{Equation 13}$$

The sample offset $\Delta I(i,j)$ for adjusting the prediction sample is calculated by the following equation.

$$\Delta I(i,j)=g_x(i,j)*\Delta mv_x(i,j)+g_y(i,j)*\Delta mv_y(i,j) \quad \text{Equation 14}$$

wherein, $\Delta mv(i,j)$ denotes a motion offset, that is, a difference between the affine motion vector in the sample (i,j) and the affine motion vector at the center position of the subblock, and may be calculated by applying Equation 11 or Equation 12 depending on the affine model type of the target block.

In other words, $\Delta mv(i,j)$ may be calculated from Equation 11 or 12 by subtracting the motion vector given when the subblock center position is input to (x,y) from the motion vector given when (i,j) is input to (x,y). In particular, $\Delta mv(i,j)$ may be calculated from an equation which is obtained by substituting (x, y) in Equations 11 and 12 with the horizontal and vertical offsets from the subblock center position to the sample position (i,j) and removing the last term "+$mv_{0x}$" and "+$mv_{0y}$." The center position may be the actual center point of the subblock, or may be the bottom-right sample position of the center point.

The motion vector of each control point of the target block used for calculation of $\Delta mv(i,j)$ and the difference between the sample position (i,j) and the center position of the subblock are the same for all subblocks. Accordingly, the values of $\Delta mv(i,j)$ may be calculated for only one subblock, for example, a first subblock, and may be reused for the other subblocks.

The technique of the present disclosure is based on the assumption that the object moves at a constant speed and the change in sample values is smooth. Therefore, sample variations in the horizontal direction and the amount of sample change in the vertical direction are obtained by multiplying the x component ($\Delta mv_x$) and y component ($\Delta mv_y$) of $\Delta mv(i,j)$ by the horizontal and vertical sample gradient values, respectively. The sample offset $\Delta I(i,j)$ is calculated by adding the two sample variations.

The final value of the predicted sample is calculated as follows.

$$I'(i,j)=I(i,j)+\Delta I(i,j) \quad \text{Equation 15}$$

When sample-by-sample adjustment for affine motion prediction samples is applied, the inter-predictor 124 of the video encoding apparatus and the inter-predictor 544 of the video decoding apparatus may be configured to perform the above-described process to modifying the sample values of the predicted samples generated through the affine motion prediction. Gradient values may be derived from the predicted samples generated through the affine motion prediction, and $\Delta mv(i,j)$ may be derived from the control point motion vectors of the target block. Therefore, it is not required that the video encoding apparatus signals additional information for the process of the present technique to the video decoding apparatus.

The sample-by-sample adjustment technique for the affine motion prediction samples described above is applied to the luma component. Additionally, the present technique may be applied even to the chroma component. In particular, $\Delta mv_x$ and $\Delta mv_y$ calculated for the luma component may be used as $\Delta mv_x$ and $\Delta mv_y$ for the chroma component without separate calculation. In other words, the video encoding apparatus and the video decoding apparatus may be configured to calculate gradient values for predicted samples of the chroma component generated through affine motion prediction. Then, predicted samples of the chroma component generated through affine motion prediction may be adjusted by substituting the gradient values of the chroma component and $\Delta mv_x$ and $\Delta mv_y$ calculated for the luma component into Equations 14 and 15.

To prevent delays due to execution of the sample-by-sample adjustment technique for the affine motion prediction samples, it may be determined whether the application of the technique is appropriate before executing the technique, and thereby the technique may be skipped without execution. As an example, the video encoding apparatus may be configured to determine whether to apply the present technique on a predefined image region basis, and signal a flag indicating whether to apply the technique to the video decoding apparatus. In particular, the predefined image region may be a sequence of pictures, a picture, or a slice. When the application of the present technique is determined on a sequence-by-sequence, picture-by-picture, or slice-by-slice basis, the flag may be included in a header (SPS) of a sequence, a header (PPS) of a picture, or a slice header. The video decoding apparatus may be configured to extract the flag contained in the bitstream and determine whether the present technique is applied to blocks in the image region corresponding to the extracted flag.

As another example, it may be predetermined whether to apply the present technique to the target block based on control point motion vectors of the target block. When the values of the control point motion vectors of the target block are all the same, this technique is not applied. When the affine type of the target block is a 4-parameter model, this technique is not executed when the control point motion vectors of the top-left corner and top-right corner are the same. In the case of the 6-parameter model, this technique is not executed when the control point motion vectors of the top-left corner, top-right corner, and bottom-left corner are the same.

As another example, it may be determined whether to apply the present technique based on the angle between the control point motion vectors. For example, when the angle between the control point motion vectors is an obtuse angle (i.e., the dot product between the vectors is negative), the present technique may not be applied. Alternatively, when the angle between the control point motion vectors is an acute angle (i.e., the dot product between the vectors is positive), the present technique may be restricted from being applied.

As another example, when the control point motion vectors of the target block refer to reference pictures in different reference picture lists, application of the present technique may be excluded. As another example, to minimize the delay, the technique may be restricted from being used together with the combined inter-intra prediction technique, as in the case of the bi-directional optical flow. In addition, the application of the present technique may be excluded when the local illumination compensation described below is applied or in the case of bi-directional prediction. Even after the sample-by-sample adjustment technique for the affine motion prediction samples is executed, the execution of the present technique may be stopped if the values of $\Delta mv_x$ and $\Delta mv_y$ are less than a predetermined threshold.

V. Local Illumination Compensation

The local illumination compensation technique is a coding technique of compensating for variation in illumination between the target block and the predicted block with a linear model. The inter-predictor 124 of the video encoding apparatus may be configured to determine a reference block in a reference picture using the motion vector (translational motion vector) of the target block, and obtain parameters of a linear model for illumination compensation using pre-reconstructed samples around (on the upper and left sides of) the reference block and pre-reconstructed samples around (on the upper and left sides of) the target block.

When the pre-reconstructed samples around the reference block are referred to as x and the corresponding pre-reconstructed samples around the target block are referred to as y, parameters "A" and "b" are derived as in Equation 16 such that the sum of squares of the differences between y and (Ax+b) is minimized.

$$\operatorname{argmin}\{\Sigma(y-Ax-b)^2\} \qquad \text{Equation 16}$$

The final predicted samples may be generated by applying the weight of A and the offset of b to the samples in the predicted block (reference block) generated by the motion vector of the target block, as shown in Equation 17. In Equation 17, pred[x][y] is a predicted sample at position (x, y) generated by the motion vector of the target block, and $\text{pred}_{LIC}[x][y]$ is the final predicted sample after illumination compensation.

$$\text{pred}_{LIC}[x][y]=A*\text{pred}[x][y]+b \qquad \text{Equation 17}$$

Another aspect of the present disclosure relates to a technique for combining the illumination compensation technique with affine motion prediction. As described above, when subblock-by-subblock affine motion prediction is applied to the target block, a motion vector is generated for each of the subblocks. The illumination compensation parameters may be derived using the corresponding motion vector for each subblock, and then the illumination compensation may be performed in the unit of the subblocks using the corresponding motion vector. This, however, not only increases the complexity of calculation but also raises a substantial delay issue. Since the reconstructed samples in each subblock are required for illumination compensation of the next subblock, the illumination compensation process for the subblock should be suspended until an adjacent subblock is reconstructed (e.g., until both the prediction block and the residual block for the subblock are reconstructed). The present disclosure is directed to addressing such issues.

Figure 11A:
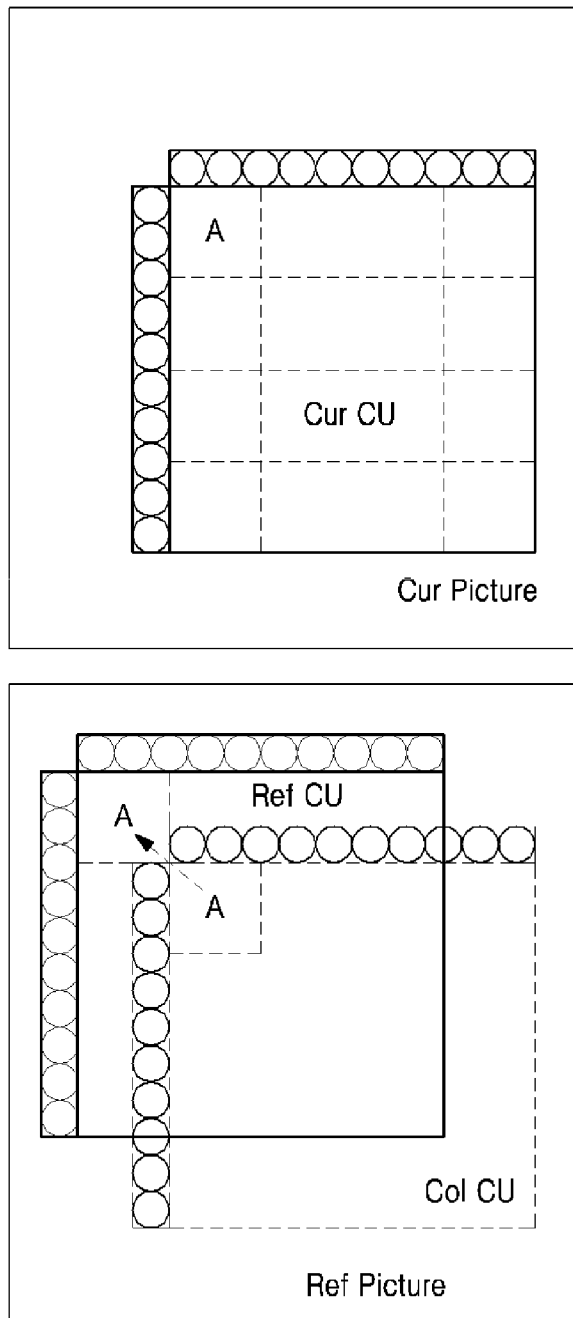
FIGS. 11A-11C are exemplary diagrams illustrating a method of deriving an illumination compensation parameter according to an embodiment of illumination compensation provided by the present disclosure.
Figure 11B:
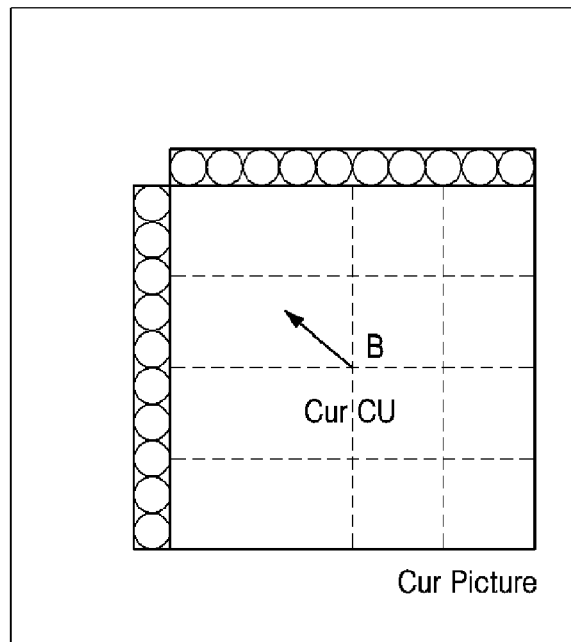
Figure 11B:
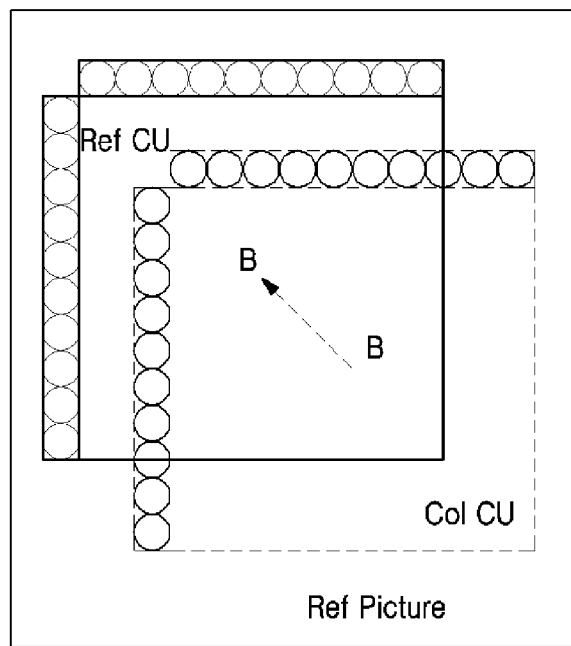
Figure 11C:
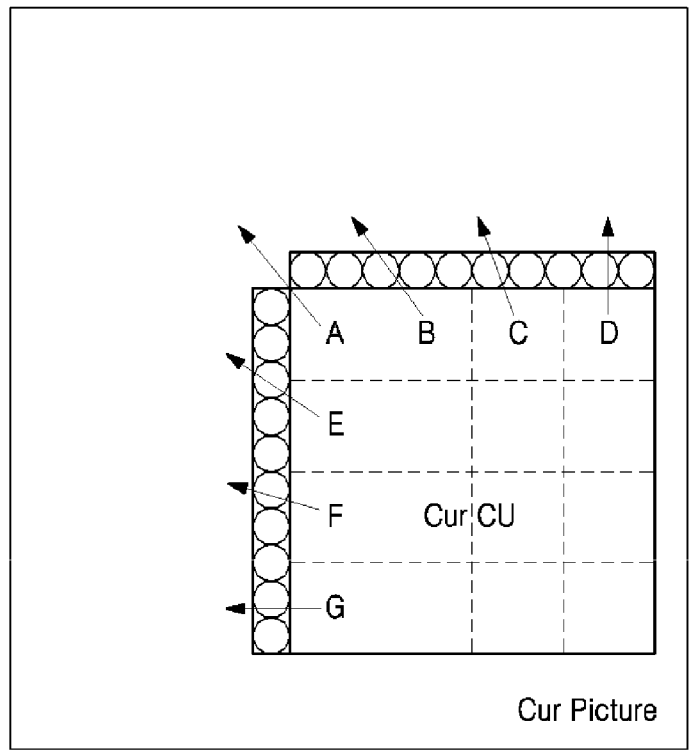
Figure 11C:
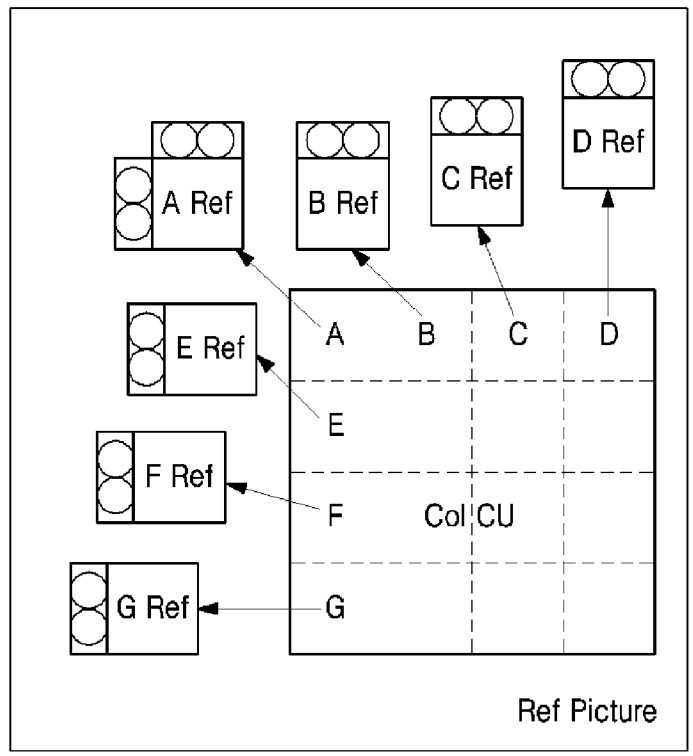

FIGS. 11A-11C show various examples of determining the position of a reference block to derive an illumination compensation parameter according to an embodiment of the present disclosure. In this exemplary embodiment, one illumination compensation parameter set (A, b) for the target block is derived, and the same parameter is applied to all subblocks in the target block. That is, the entire target block is modified with one illumination compensation parameter set.

As shown in FIG. 11A, the inter-predictor 124 of the video encoding apparatus may be configured to determine the position of the reference block in the reference picture using the affine motion vector of the subblock located at the top left of the target block or the top-left corner control point motion vector of the target block. The pre-reconstructed samples around the determined reference block are used for parameter derivation. Alternatively, as shown in FIG. 11B, the position of the reference block may be determined using the affine motion vector of the center subblock in the target block. Once the position of the reference block is determined, the illumination compensation parameter may be derived using the pre-reconstructed samples adjacent to the top and left sides of the reference block and the corresponding pre-reconstructed samples adjacent to the top and left sides of the target block.

As another example, a plurality of subblocks in the target block may be used. As shown in FIG. 11C, the inter-predictor 124 may be configured to determine a reference subblock corresponding to each boundary subblock using affine motion vectors of the subblocks (boundary subblocks) located at the boundary in the target block. Samples for deriving the illumination compensation parameter may be extracted from pre-reconstructed samples adjacent to the boundary subblocks in the target block and the corresponding reference subblocks, respectively. For the subblocks located at the top boundary in the target block and the corresponding reference subblocks, the samples are extracted from pre-reconstructed samples adjacent to the top side. For the subblocks located at the left boundary in the target block and the corresponding reference subblocks, the samples may be extracted from pre-reconstructed samples adjacent to the left side.

One or more coding tools described above may be used to improve the prediction performance of inter-prediction. To address issues such as complexity or delay, applying some coding tools may require the other coding tools to be excluded from being applied.

In addition, both the sample-by-sample adjustment for affine prediction samples and the bi-directional optical flow are techniques for modifying the predicted samples after the prediction, and use gradients of the samples for the modification. Accordingly, to reduce the computational complexity and hardware complexity, the equation for the bi-directional optical flow may be modified in the form of the equation for sample-by-sample adjustment for affine prediction samples in bi-directional prediction. Alternatively, the equation for sample-by-sample adjustment for affine prediction samples in bi-directional prediction may be modified in the form of the equation for the bi-directional optical flow.

For example, in the case of bi-directional prediction, the video encoding apparatus and the video decoding apparatus may be configured to perform sample-by-sample adjustment for the affine prediction samples for each of the reference pictures in reference picture list 0 and the reference pictures in reference picture list 1, thereby generating two predicted blocks. The two predicted blocks are generated by Equation 14 or 15. The final prediction block for the target block may be generated by averaging the two predicted blocks. When the bit-depth is 10, the process of generating the final prediction block is expressed as follows.

$$I'(i, j) = \text{Clip3}\begin{pmatrix} 0, 1023, \\ (I_0(i, j) + \text{Clip3}(-2^{13}, 2^{13} - 1, ((g_{x0}(i, j) * \Delta mv_{x0}(i, j) + \\ g_{y0}(i, j) * \Delta mv_{y0}(i, j) + 1) \gg 1)) + I_1(i, j) + \text{Clip3} \\ (-2^{13}, 2^{13} - 1, ((g_{x1}(i, j) * \Delta mv_{x1}(i, j) + g_{y1}(i, j) * \\ \Delta mv_{y1}(i, j)) + 1) \gg 1)) + 16400) \gg 5 \end{pmatrix} \quad \text{Equation 18}$$

In Equation 18, "$I_0(i,j)$+clip3( )" is a predicted block from the reference pictures in reference picture list 0, and "$I_1(i, j)$+clip3( )" is a predicted block from the reference pictures in reference picture list 1. By substituting Equation 9 into Equation 10, the equation for obtaining the final predicted sample in the bi-directional optical flow may be expressed as follows.

$$I'(i, j) = \text{Clip3}\begin{pmatrix} 0, 1023, \\ (I0(i, j) + I1(i, j) + (((g_{x1}(i, j) - g_{x0}(i, j)) * v_x(i, j) + \\ (g_{y1}(i, j) - g_{y0}(i, j)) * v_y(i, j) + 1) \gg 1) + 16400) \gg 5 \end{pmatrix} \quad \text{Equation 19}$$

Equation 19 is expressed in the form of Equation 18 as follows.

$$I'(i, j) = \text{Clip3}\begin{pmatrix} 0, 1023, \\ (I0(i, j) + \text{Clip3}(-2^{13}, 2^{13} - 1, (((-g_{x0}(i, j)) * v_x(i, j) + \\ (-g_{y0}(i, j)) * v_y(i, j) + 1) \gg 1)) + \\ I1(i, j) + \text{Clip3}(-2^{13}, 2^{13} - 1, ((g_{x1}(i, j) * v_x(i, j) + \\ g_{y1}(i, j) * v_y(i, j) + 1) \gg 1) + 16400) \gg 5 \end{pmatrix} \quad \text{Equation 20}$$

In other words, the final predicted sample to which the bi-directional optical flow is applied may be calculated through Equation 20 instead of Equation 19. Since Equation 20 is expressed in a form similar to the sample-by-sample adjustment technique for the affine predicted samples, there is no need to separately design hardware for implementing the equation according to the bi-directional optical flow technique. In addition, since Equation 20 is expressed in the form of an average of the predicted block from the reference pictures in reference picture list 0 and the predicted block from the reference pictures in reference picture list 1, hardware design is simplified.

It should be understood that the exemplary embodiments described above may be implemented in many different ways. The functions described in one or more examples may be implemented in hardware, software, firmware, or any combination thereof. It should be understood that the functional components described herein have been labeled ".unit" to further emphasize their implementation independence.

Various functions or methods described in the present disclosure may be implemented with instructions stored in a non-transitory recording medium that can be read and executed by one or more processors. Non-transitory recording media include, for example, all types of recording devices in which data is stored in a form readable by a computer system. For example, non-transitory recording media include storage media such as erasable programmable read only memory (EPROM), flash drives, optical drives, magnetic hard drives, and solid state drives (SSDs).

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. A video decoding method for decoding a video data by a video decoding apparatus, comprising:
   generating affine prediction samples for respective subblocks in a target block in a current picture to be decoded, by performing affine motion prediction on a subblock-by-subblock basis using a plurality of control point motion vectors of the target block;
   determining whether to execute a first coding tool based on at least one of values of the control point motion vectors or an angle between the control point motion vectors;
   in response to determining that the first coding tool is executed, modifying sample values of the affine prediction samples by compensating for motion according to sample positions in each of the subblocks using the control point motion vectors;
   obtaining sample values of residual samples; and
   decoding the target block based on the sample values of the residual samples and the modified sample values of the affine prediction samples,
   wherein, when the values of the control point motion vectors are equal to each other, executing the first coding tool for modifying the sample values of the affine prediction samples generated by performing the affine motion prediction is skipped.

2. The method of claim 1, when the first coding tool is executed, further comprising:
   generating, using the control point motion vectors of the target block, a motion offset resulting from a difference between a sample position in a target subblock to be corrected and a center of the target subblock;
   generating horizontal and vertical gradients for the sample position in the target subblock;
   generating a sample offset for an affine prediction sample corresponding to the sample position in the target subblock using the horizontal and vertical gradients and the motion offset; and
   adding the sample offset to a sample value of the affine prediction sample corresponding to the sample position.

3. The method of claim 1, wherein, when a dot product of the control point motion vectors yields a negative value, executing the first coding tool is skipped.

4. The method of claim 1, further comprising:
   decoding, from a header of each picture in a bitstream, a picture level flag indicating whether the first coding tool is allowed for a picture related to the header; and
   determining whether to execute the first coding tool for the target block based on a value of the picture level flag extracted from the header of the current picture containing the target block.

5. The method of claim 2, wherein, when horizontal and vertical components of the motion offset are less than a predefined threshold, execution of the first coding tool is stopped.

6. A video encoding method for encoding a video data by a video encoding apparatus, comprising:
   generating affine prediction samples for respective subblocks in a target block to be decoded, by performing affine motion prediction on a subblock-by-subblock basis using a plurality of control point motion vectors of the target block;
   determining whether to execute a first coding tool based on at least one of values of the control point motion vectors or an angle between the control point motion vectors;
   in response to determining that the first coding tool is executed, modifying sample values of the affine prediction samples by compensating for motion according to sample positions in each of the subblocks using the control point motion vectors;
   generating sample values of residual samples based on the target block and the modified sample values of the affine prediction samples; and
   encoding the sample values of the residual samples,
   wherein, when values of the control point motion vectors are equal to each other, executing the first coding tool for modifying the sample values of the affine prediction samples generated by performing the affine motion prediction is skipped.

7. The method of claim 6, wherein, when the first coding tool is executed, further comprising:
   generating, using the control point motion vectors of the target block, a motion offset resulting from a difference between a sample position in a target subblock to be corrected and a center of the target subblock;
   generating horizontal and vertical gradients for the sample position in the target subblock;
   generating a sample offset for an affine prediction sample corresponding to the sample position in the target subblock using the horizontal and vertical gradients and the motion offset; and
   adding the sample offset to a sample value of the affine prediction sample corresponding to the sample position.

8. The method of claim 6, wherein, when a dot product of the control point motion vectors yields a negative value, executing the first coding tool is skipped.

9. The method of claim 6, further comprising:
   encoding, in a header of each of the pictures, a picture level flag indicating whether the first coding tool is allowed; and
   determining whether to execute the first coding tool for the target block based on a value of the picture level flag contained in the header of the current picture containing the target block.

10. The method of claim 7, wherein, when horizontal and vertical components of the motion offset are less than a predefined threshold, execution of the first coding tool is stopped.

11. A non-transitory recording medium storing a bitstream generated by a video encoding method, the method comprising:

generating affine prediction samples for respective subblocks in a target block to be decoded, by performing affine motion prediction on a subblock-by-subblock basis using a plurality of control point motion vectors of the target block;

determining whether to execute a first coding tool based on at least one of values of the control point motion vectors or an angle between the control point motion vectors;

in response to determining that the first coding tool is executed, modifying sample values of the affine prediction samples by compensating for motion according to sample positions in each of the subblocks using the control point motion vectors;

generating sample values of residual samples based on the target block and the modified sample values of the affine prediction samples; and encoding the sample values of the residual samples, wherein, when values of the control point motion vectors are equal to each other, executing the first coding tool for modifying the sample values of the affine prediction samples generated by performing the affine motion prediction is skipped.

* * * * *